US012404928B1

(12) United States Patent
Nguyen

(10) Patent No.: US 12,404,928 B1
(45) Date of Patent: Sep. 2, 2025

(54) GEAR UNIT WITH BUILT-IN PARKING LOCK UNIT

(71) Applicant: GKN Automotive Limited, Birmingham (GB)

(72) Inventor: Son Duy Nguyen, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/956,427

(22) Filed: Nov. 22, 2024

(30) Foreign Application Priority Data

Jul. 18, 2024 (JP) .................................. 2024-114561
Jul. 18, 2024 (JP) .................................. 2024-114563

(51) Int. Cl.
*F16H 63/34* (2006.01)
*F16H 37/08* (2006.01)
*F16H 57/021* (2012.01)
*F16H 57/037* (2012.01)
*F16H 57/02* (2012.01)

(52) U.S. Cl.
CPC ..... *F16H 63/3425* (2013.01); *F16H 37/0813* (2013.01); *F16H 57/021* (2013.01); *F16H 57/037* (2013.01); *F16H 63/3466* (2013.01); *F16H 2057/02034* (2013.01); *F16H 2057/02052* (2013.01)

(58) Field of Classification Search
CPC . B60K 1/00; B60K 2001/001; F16H 63/3425; F16H 63/3466; F16H 57/021; F16H 57/037; F16H 2057/02034; F16H 2057/02052
See application file for complete search history.

(56) References Cited

U.S. PATENT DOCUMENTS 10,260,574 B2 * 4/2019 Yamamoto .......... F16H 63/3458
2014/0155214 A1 * 6/2014 Kimura ................ F16H 57/045
475/160

FOREIGN PATENT DOCUMENTS

| CN | 105691177 A | * | 6/2016 | |
|---|---|---|---|---|
| CN | 116357734 A | * | 6/2023 | ........ F16H 63/3416 |
| DE | 102017124499 A1 | * | 4/2018 | ........ F16H 63/3433 |
| EP | 4414585 A1 | * | 8/2024 | ............. B60K 1/00 |
| JP | 2021095956 A | | 6/2021 | |
| WO | WO-2019216043 A1 | * | 11/2019 | ............. H02K 11/33 |
| WO | WO2020067281 A1 | | 4/2020 | |

* cited by examiner

*Primary Examiner* — Sherry L Estremsky
(74) *Attorney, Agent, or Firm* — Reising Ethington P.C.

(57) ABSTRACT

A gear unit to be used in combination with a power source having a hollow output shaft, is provided with a differential gear set having a rotation axis in common with the output shaft, a counter shaft fixedly including a first gear in mesh with the output shaft, and a second gear in mesh with the differential gear set. The first gear and the second gear constitutes a reduction gear set, a housing including an outer wall parting the differential gear set and the counter shaft from an exterior, and a parking gear disposed axially opposite to the first gear beyond the second gear and fixed to the counter shaft.

9 Claims, 5 Drawing Sheets

GEAR UNIT WITH BUILT-IN PARKING LOCK UNIT

CROSS REFERENCE TO RELATED APPLICATIONS

This application is based upon and claims priority from Japanese Patent Application No. 2024-114561 filed on Jul. 18, 2024 and Japanese Patent Application No. 2024-114563 filed on Jul. 18, 2024, the entire contents of which are incorporated herein by reference.

TECHNICAL FIELD

The disclosure herein relates to a gear unit usable as a dual-shaft reduction gear set when used in combination with an electric motor with a hollow output shaft, and to a reduction gear unit with a built-in parking lock unit.

BACKGROUND

In the field of vehicle technology, many techniques are under study for replacement of internal combustion engines with electric motors. Torque generated by an electric motor is in general multiplied by a reduction gear set and then output to axles via a differential. To constitute a driving unit for a vehicle in a compact form and facilitate its handling, the reduction gear set and the differential are sometimes packed in a single unit and further integrated with the electric motor. The differential may be coaxial with the electric motor in this configuration and its output shaft may be in this case formed in a hollow shape in order to pass one of the axles through the shaft.

A driving unit of the aforementioned type may be provided with a built-in parking lock unit. Japanese Patent Application Publication 2021-95956 A and International Publication WO 2020/067281 A1 disclose related arts.

SUMMARY

As will be readily understood, the driving unit contains a large number of elements as described above. How to arrange and pack these elements in a housing should be viewed as a technical issue. If elements were added alongside the electric motor having a laterally directed shaft for example, the driving unit must be naturally elongated in the lateral direction and instead the axles are required to be shortened. Such axially shortened axles have an insufficient capacity for rocking and therefore may result in adverse effect on ride quality of the vehicle. Alternatively, if its dimensions were increased not in the axial direction but in its height direction, the center of mass would be set upward and stability of the vehicle would be damaged. The art disclosed hereinafter has been devised to solve these problems.

According to an aspect, a gear unit to be used in combination with a power source having a hollow output shaft, is provided with: a differential gear set having a rotation axis in common with the output shaft; a counter shaft fixedly including a first gear in mesh with the output shaft and a second gear in mesh with the differential gear set, wherein the first gear and the second gear constitutes a reduction gear set; a housing including an outer wall parting the differential gear set and the counter shaft from an exterior; and a parking gear disposed axially opposite to the first gear beyond the second gear and fixed to the counter shaft.

BRIEF DESCRIPTION OF THE DRAWINGS

The following detailed description of certain embodiments and best mode will be set forth with reference to the accompanying drawings, in which.

DETAILED DESCRIPTION

Exemplary embodiments will be described hereinafter with reference to the appended drawings.

Drawings are not necessarily made to scale and therefore it is particularly noted that dimensional relations are not limited to those drawn therein. Directions are indicated by arrows F, A, R, L, U and D in each drawing. These directions are, in an ordinary embodiment, corresponding to forward, rearward, rightward, leftward, upward and downward with respect to a vehicle, but the right and the left of the device, or the upside and the downside, may be reversed, or the device may be turned in any other direction or inclined.

A gear unit 1 according to the present embodiment is a reduction gear used in combination with a power source 3 such as an electric motor having a hollow output shaft 5, which is provided with a parking lock device 7. Of course, it can be combined and used with not the electric motor but an internal combustion engine or a so-called hybrid system.

Figure 1:
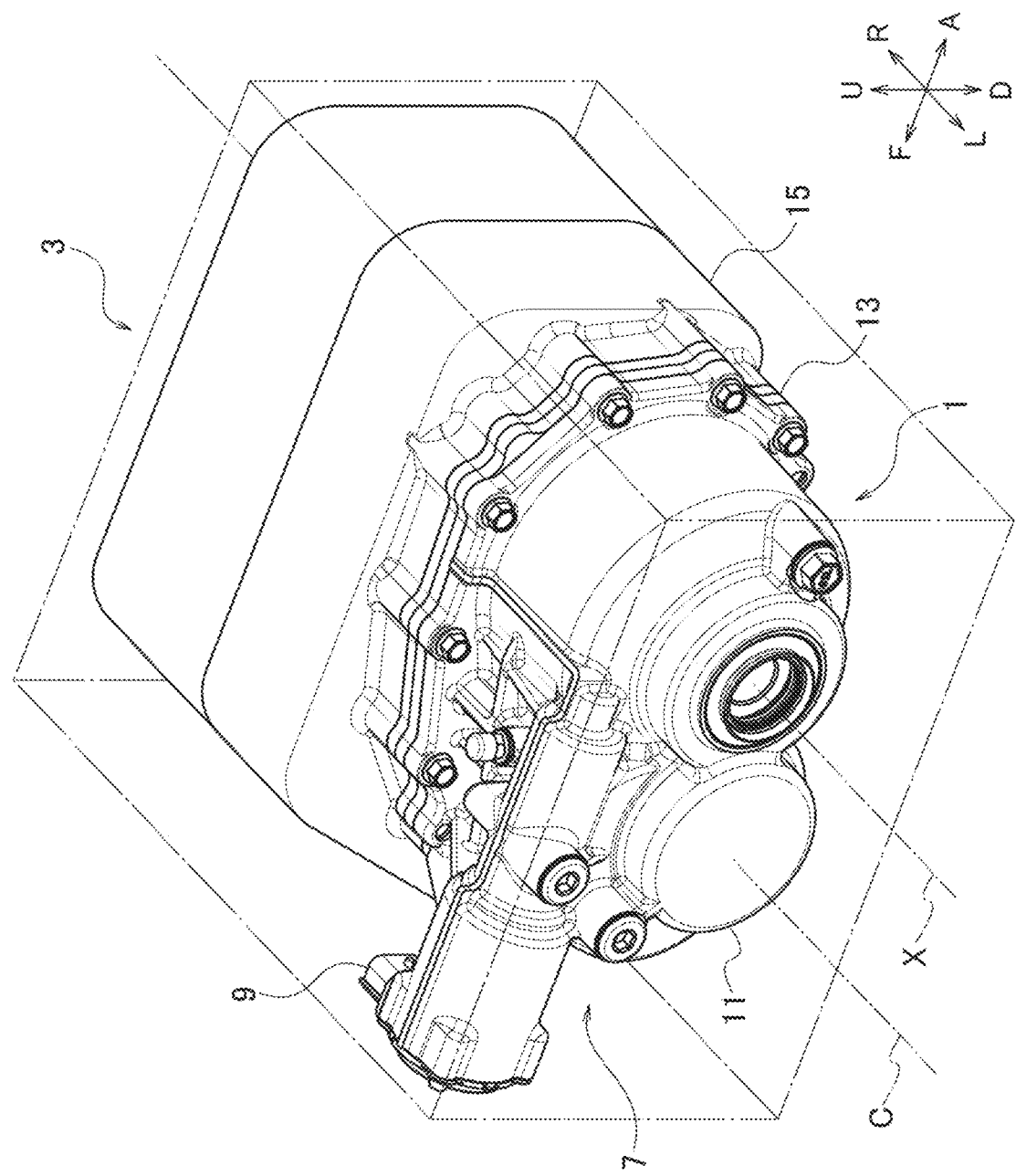
FIG. 1 is a perspective view of a gear unit combined with a power source.
Figure 2:
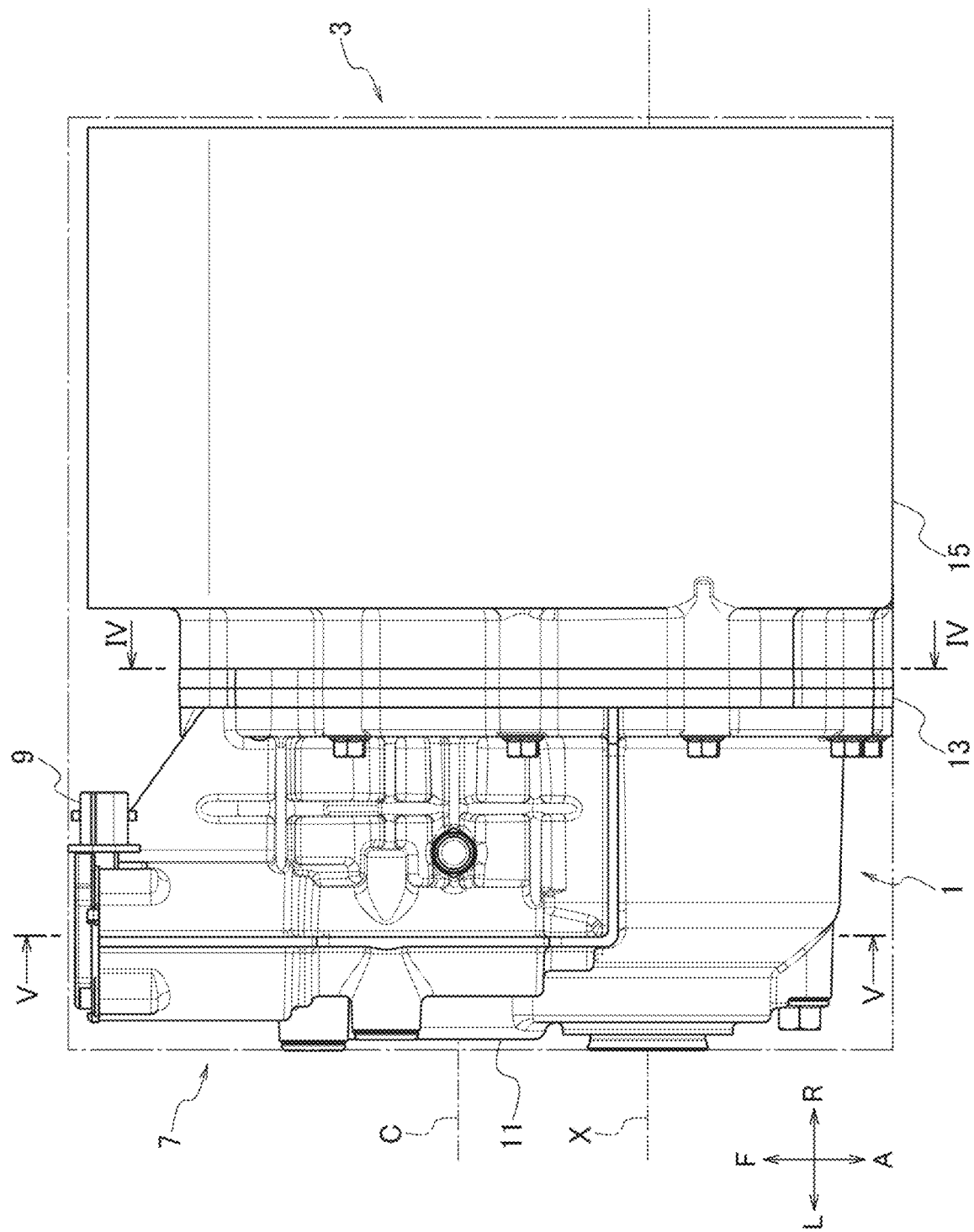
FIG. 2 is a plan view of the gear unit combined with the power source.
Figure 3:
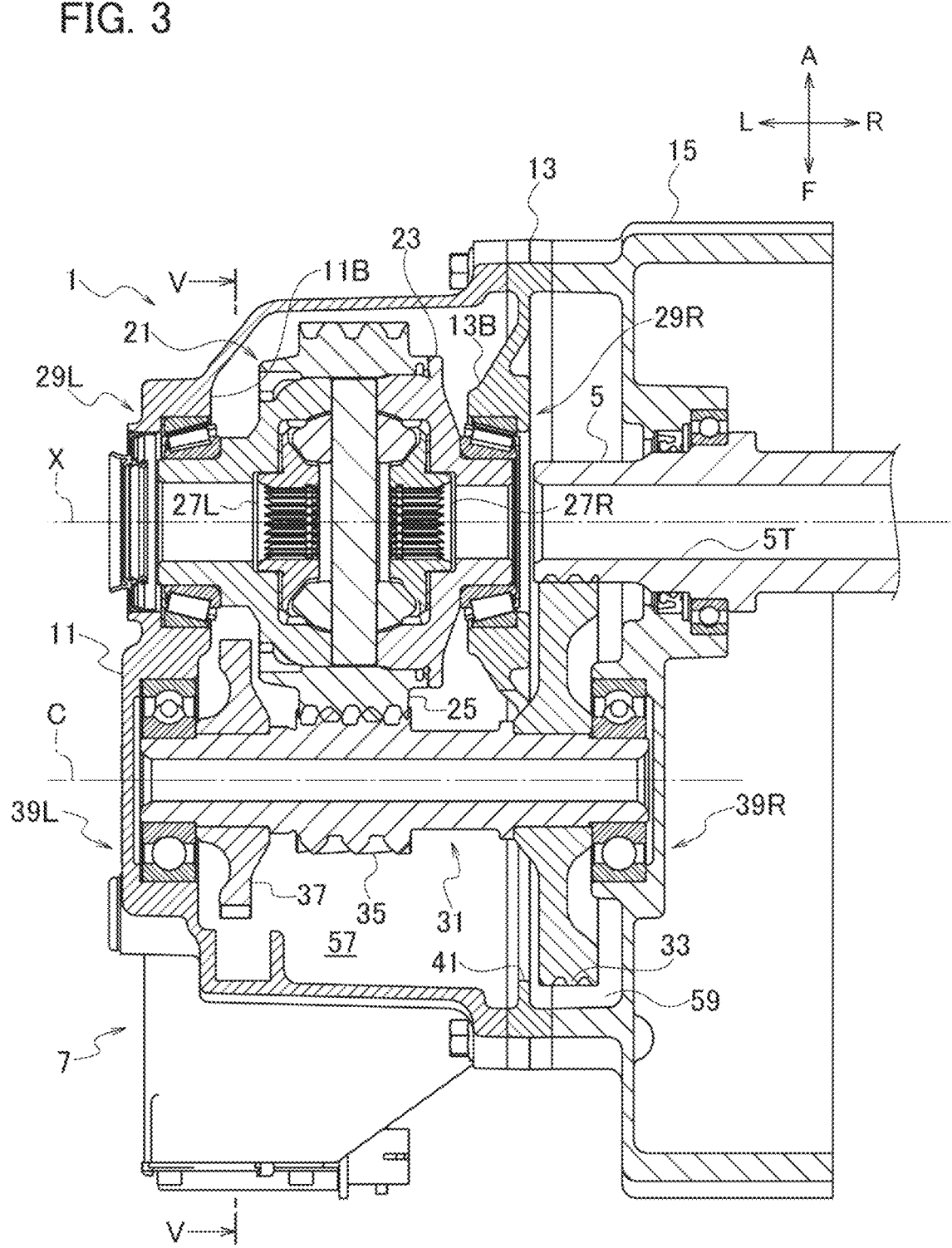
FIG. 3 is a sectional view of the gear unit viewed from underneath, taken from a plane passing through both an axis of a differential and an axis of a counter shaft.

Referring mainly to FIG. 3 in combination with FIGS. 1 and 2, the gear unit 1 is housed in a housing separably combinable with the power source 3, and the housing is further provided with an outer wall 11, a partition wall 13 and a cover 15, which are separably combined together. The housing may of course contain any other elements.

One end of the output shaft 5 crosses over the cover 15 and intrudes into the gear unit 1. This end is toothed to have gear teeth, or a toothed gear as a separate body is combined therewith. The output shaft 5 is hollowed to define a cylindrical cavity 5T so dimensioned as to allow the right axle to pass therethrough.

The gear unit 1 is, in the housing, provided with a differential gear set 21 and a counter shaft 31 in mesh with each other.

The differential gear set 21 has a rotation axis X in common with the output shaft 5, and is rotatable about the rotation axis X. The counter shaft 31 is rotatable about a counter axis C parallel with, but not identical to, the rotation axis X, and is in mesh with both the output shaft 5 and the differential gear set 21. The differential gear set 21 receives torque via the counter shaft 31 and, through side gears 27R, 27L, differentially distributes the torque to both the axles. The right axle passes through the cavity 5T to couple with the right side gear 27R and the left axle passes through an opening of the outer wall 11 to couple with the left side gear 27L.

The differential gear set 21 is provided with a differential case 23 forming a near-cylindrical shape near-symmetric about the axis X for example. From both ends of the differential case 23, boss portions respectively project and are rotatably supported by the housing. The differential case 23 has gear teeth 25 fixed on the outer periphery thereof for example and thereby meshes with the counter shaft 31. The gear teeth 25, may be in the form of a helical gear, may be directly formed on the differential case 23 but may be a separate body combined with the differential case 23.

The differential gear set 21 may be a bevel gear type as exemplarily shown in the drawings and is provided with pinion shafts fixed to the differential case 23 and pinion gears rotatably supported thereby to differentially distribute the torque to the side gears 27R, 27L, which are in mesh with the pinion gears. Of course, any other type of gear such as a face gear or a planetary gear may be applied to the differential gear set 21. Further, the differential gear set 21 may be provided with a limited-differential mechanism or a differential-locking mechanism.

The counter shaft 31 is immovably provided with a large-diameter first gear 33 and a smaller-diameter second gear 35, both of which may be helical gears. The first gear 33 is in mesh with the output shaft 5 and the second gear 35 is in mesh with the gear teeth 25 of the differential gear set 21. The difference in diameter renders the combination of the gears be a reduction gear set so that the combination multiplies and transmits the torque to the differential gear set 21. The first gear 33 may be disk-like about the counter axis C for example and the gear teeth are formed on its periphery. It may form a unitary body with the counter shaft 31 but may be produced as a separate body for convenience of production and coupled with the counter shaft 31. For this coupling, for example, spline coupling or lug coupling is applicable, or welding or press-fitting may be used. The second gear 35 may be formed as a unitary body with the counter shaft 31, or produced as a separate body and combined with the shaft. As will be readily understood from FIG. 3, as any particular element is not interposed between the first gear 33 and the second gear 35, the first gear 33 and the second gear 35 can be made possibly close to each other. This is advantageous in reducing the size of the gear unit 1 in a direction of the axes C and X.

Figure 5:
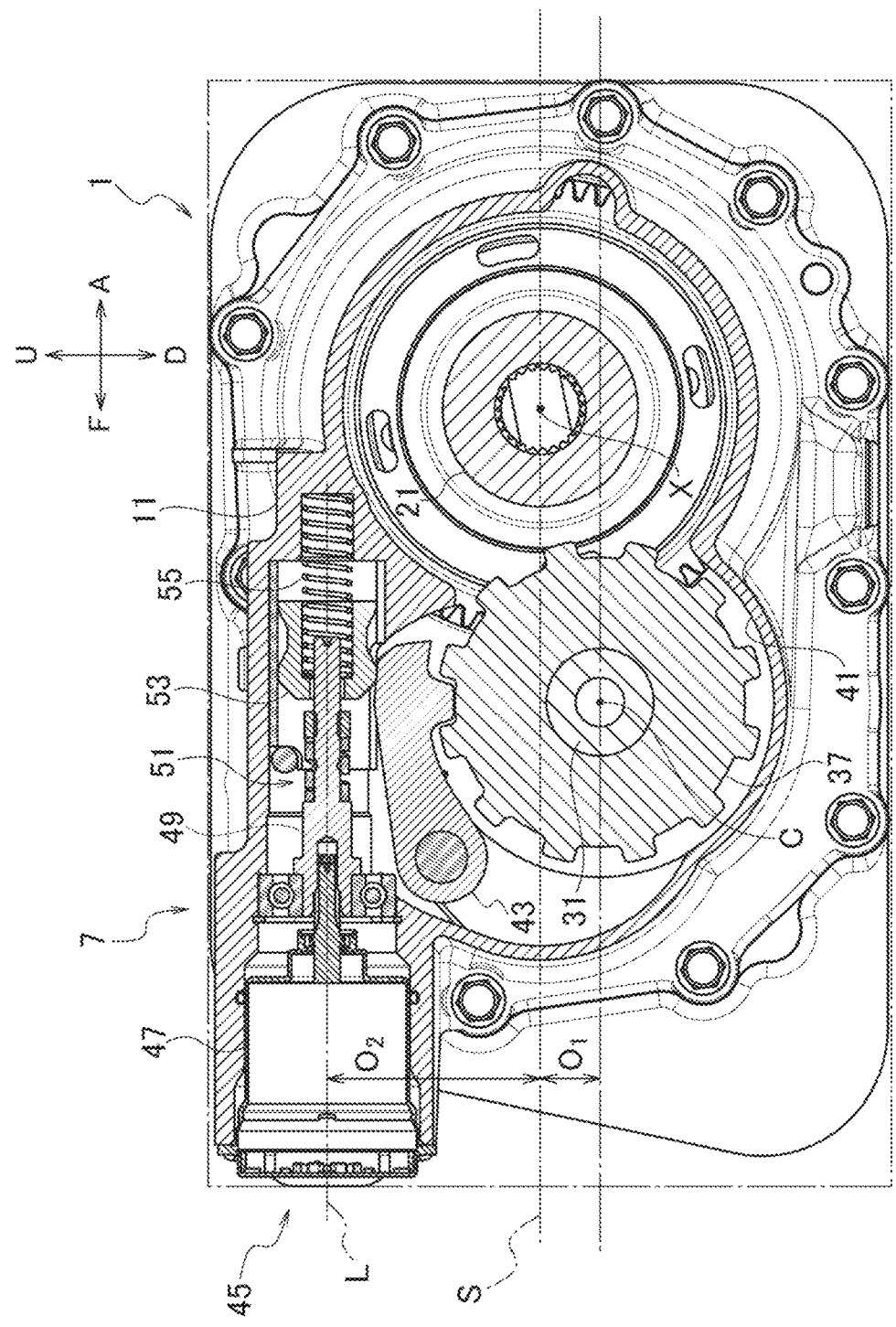
FIG. 5 is a sectional side view of the gear unit viewed from a side opposite to the side shown in FIG. 4 and taken from a line V-V shown in FIG. 3.

Referring to FIG. 3 in combination with FIG. 5, the counter shaft 31 is further provided with a parking gear 37 immovably, which constitutes the parking lock device 7. The parking gear 37 is needless to say disposed axially outward from the first gear 33 and the second gear 35, or disposed axially opposite to the first gear 33 beyond the second gear 35 and close to the end farthest from the power source 3. Specifically, the parking gear 37 is very close to the outer wall 11 and can be disposed between a bearing 39L described later and the second gear 35. This arrangement, as being readily understood from FIG. 3, does not affect the size of the gear unit 1 in the axial direction (the lateral direction in the example shown in the drawings) and is therefore advantageous in reducing the size of the gear unit 1. The gear parking gear 37 is also disk-like and its outer periphery is toothed to have locking teeth distinct from gear teeth. The parking gear 37 may be a unitary body with the counter shaft 31 but may be produced as a separate body for convenience of production and fixed to the counter shaft 31 by press-fitting, spline-coupling or such.

Referring mainly to FIG. 5, the parking lock device 7 is further provided with a pawl 43 to be in mesh with the parking gear 37 and an actuator 45 for driving the pawl.

The pawl 43 is pivotally supported by the outer wall 11 and, by rocking around the pivot, engages with the parking gear 37 to immobilize the counter shaft 31. The pawl 43 is disposed between the second gear 35 and the outer wall 11, and further between the actuator 45 and the parking gear 37. Although not shown in the drawings, around the pivot, the pawl 43 may be provided with a spring biased in a direction to promote disengagement.

To the actuator 45 applicable is a device that directly applies rotational force to the shaft of the pawl 43 or any electrically-powered device that creates a linear motion along a working axis L. As the electrically-powered device, any fluid pressure device using hydraulic or pneumatic pressure can be exemplified, whereas a combination of a motor and a cam mechanism may be used in a way as described below.

The actuator 45 in the shown example is provided with a motor 47, a spindle 49 having threads on its outer periphery, a spindle nut 51 threaded onto and movable linearly along the spindle 49, and a cone 53 following the spindle nut 51 to work on the pawl 43. The motor 47 controllably creates a rotational motion around the working axis X and the spindle 49 driven thereby creates a linear motion. Specifically, the combination of the spindle 49 and the spindle nut 51 functions as a type of cam mechanism. A coil spring 55 may be used to press the cone 53 against the spindle nut 51 so that the cone 53 follows the spindle nut 51. The outer face of the cone 53 is appropriately profiled so that the outer face presses the pawl 43 to create a rocking motion under control. The actuator 45 structured in this way is compact in the radial direction, setting aside the axial direction, and is thus advantageous in reducing the size of the gear unit 1. With directing the working axis L perpendicular to the axes C, X as in the illustrated example, the aforementioned actuator is advantageous in reducing the size of the gear unit 1 in both the directions along the axes C, X.

Referring again to FIGS. 1, 2 and 3, the housing contains an outer wall 11, a partition wall 13 and a cover 15 for example. These elements are separably combined together to accommodate and support the aforementioned components. The cover 15 may also serve as a cover for the power source 3.

The outer wall 11 is so dimensioned as to part the differential gear set 21 and the counter shaft 31 from the exterior. The wall as a whole may be formed as a unitary body by casting or such or may be further separable into a plurality of components. The outer wall 11 may be in general in a form such as two adjoining pots combined together, respectively housing the differential gear set 21 and the counter shaft 31. These pots are, however, internally spatially in communication with each other, of course.

A part corresponding to bottoms of these pots, namely a side wall of the outer wall 11, is closed at a portion corresponding to the counter shaft 31 but has an opening at a portion corresponding to the differential gear set 21. The left axle passes through this opening and is coupled with the side gear 27L. Into this opening in addition, normally, a sealing member for fluid-tightly sealing a gap between the axle and the outer wall 11 is fitted. The outer wall 11 may additionally be provided with any through-holes aside from the aforementioned opening, for the purpose of introduction of lubricant oil for example.

The outer wall 11 is further provided with a cylindrical portion along the pot-like part, which projects in a direction along an arrow F, and the actuator 45 is housed and fixed there. As best shown in FIG. 5, the pawl 43 is arranged along this portion and pivotally supported by the outer wall 11. The part that houses the actuator 45 can be disposed very close to the side wall, aligning its side face substantially with the side wall in a plan view as shown in FIG. 2, and is thus not projecting from the side wall in the direction along the arrow L. This is advantageous in reducing the size of the gear unit 1 in the directions of the axes C, X. It may, however, project to some extent in the direction of the arrow F and in this part the motor 47 and a connector 9 for electric connection to the motor 47 may be arranged. The connector 9 is exposed to the exterior in the direction of the arrow R for example. This arrangement is beneficial in light of accessibility from the exterior to the connector 9 and thus facilitates work for connection of a harness to the connector 9. Further as being readily understood from FIGS. 1 and 4, when used in a way as shown in the drawings, the connector 9 is naturally disposed uppermost in the gear unit 1. This location is unlikely to be affected by dirt or any foreign substance splashed from the road and is therefore advantageous in prevention of malfunction.

Figure 4:
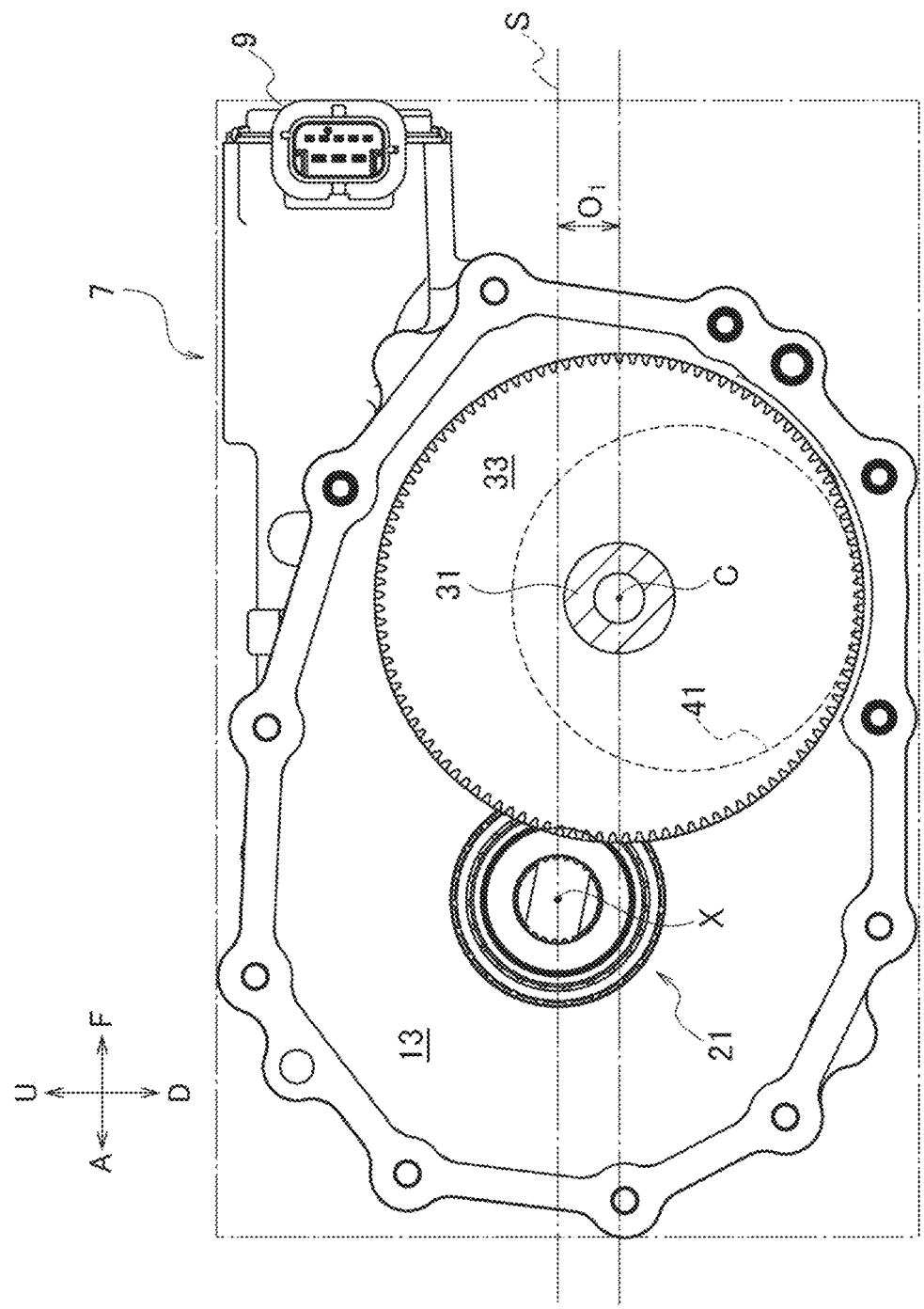
FIG. 4 is a side view of the gear unit, which is separated from the power source at a line IV-IV shown in FIG. 2 and then viewed from the side of the power source.

Referring to FIGS. 4 and 5 in combination with FIG. 1, the parking lock device 7 projects forward, whereas the gear unit 1 as a whole is in a range of the power source 3 when viewed from the side. In particular, when the power source 3 is projected on a plane perpendicular to the rotation axis X and the counter axis C, aside from the motor 47 and the connector 9, the differential gear set 21, the counter shaft 31, the housing, the pawl 43 and the cam mechanism are arranged in the range of this projection on the plane. More specifically, it is apparent that the gear unit 1 can be designed compact at least in height and in length in the front-back direction.

Referring to FIG. 4 in combination with FIGS. 1 through 3, the housing may be provided with the partition wall 13, which may support at least the differential gear set 21. For support of the gear set, the outer wall 11 is provided with a left bearing 29L and the partition wall 13 is provided with a right bearing 29R, and roller bearings for example fit therein respectively, thereby rotatably supporting boss portions of the differential gear set 21. To strengthen the support, peripheries of the partition wall 13 may expand to the peripheral wall of the housing and may be totally put between the outer wall 11 and the cover 15, thereby being secured together. The counter shaft 31 may be also supported by the partition wall 13 or instead supported by the cover 15 in place of the partition wall 13. In any case, the counter shaft 31 passes over the partition wall 13 to reach a space 59 defined by the partition wall 13 and the cover 15, and is there coupled with the first gear 33 and meshes with the output shaft 5.

The partition wall 13, when combined with the outer wall 11, defines a chamber 57. The chamber 57 accommodates the differential gear set 21, the second gear 35, the parking gear 37 and the pawl 43. The first gear 33 is outside the chamber 57 and disposed in the space 59 defined by the partition wall 13 and the cover 15. The space 59 is not separated from the chamber 57 but has an opening 41 penetrating the partition wall 13 to allow at least mutual fluid communication. The opening 41 enables circulation of the lubricant oil and for example the oil splashed by the first gear 33 passes through the opening 41 to circulate around respective elements in the gear unit 1. The opening 41 may be further dimensioned to allow the parking gear 37 to pass therethrough. This is, as will be described later, advantageous in assembly of the gear unit 1.

The cover 15 adjoins the right end of the partition wall 13 and also, in combination with the outer wall 11, pinches the partition wall 13 and then these walls are coupled together. The cover 15 has the opening where the output shaft 5 passes but is at the portion corresponding to the counter shaft 31 closed, thereby substantially isolating the interior of the gear unit 1 from the power source 3. Around the output shaft 5, any sealing member may be interposed, thereby establishing fluid-tightness of the interior of the gear unit 1 from the power source 3. This is beneficial in light of separation of the lubricant oil in the gear unit 1 from the lubricant oil in the power source 3. A portion of the cover 15 corresponding to the counter shaft 31 may have a bearing 39R. Accordingly, the outer wall 11 may be provided with a bearing 39L, thereby having both ends of the counter shaft 31 supported by the bearings 39R, 39L. Needless to say, ball bearings or such may be interposed between the bearings 39R, 39L and the counter shaft 31. Further, respective inner races of these ball bearings may serve as bases for supporting the parking gear 37 and the first gear 33 in the axial direction when hub sections of these gears 37 and 33 are made to butt against these inner races.

According to the structure as described above, the counter axis C, the rotation axis X and the working axis L are set in a particular dimensional relation. As being understood from FIGS. 2 and 3, the parking lock device 7 can be arranged away from relatively large components such as the first gear 33 and the differential gear set 21 and arranged close to the side wall of the housing. FIG. 5 for example may plainly exhibit that the working axis L of the actuator 45 comes very close to the counter axis C. This is beneficial in reduction of the size of the gear unit 1, particularly in height. The counter axis C may be set off downward from the rotation axis X in order to further reduce the size in height. Referring mainly to FIGS. 4 and 5, considering a reference plane S including the rotation axis X (the horizontal plane if the gear unit 1 is used in a way as shown in the drawings), the counter axis C may have an offset $O_1$ from the reference plane S. Then an offset $O_2$ of the working axis L can be reduced by the offset $O_1$ (the offset $O_1$ and the offset $O_2$ are directed in opposite directions relative to the reference plane S). This contributes to getting down the actuator 45, thereby reducing the size of the gear unit 1 in height. Existence of the offset $O_1$ further causes the first gear 33 to get a lowermost position among all the rotating elements. This is advantageous in splashing up and circulating the lubricant oil out of the bottom because the outer periphery of the gear 33 sweeps the lowermost point of the housing.

A process for assembling the gear unit 1 is carried out in a way described below for example.

First, the first gear 33 and the parking gear 37 are coupled to the counter shaft 31 including the first gear 35. The resultant counter shaft 31 is passed through the opening 41 and combined with the partition wall 13. In parallel, the differential gear set 21 is assembled and is, along with the roller bearings, fitted into the bearing 29R on the partition wall 13. By slightly moving the counter shaft 31 as a whole sideways, the second gear 35 is set in mesh with the gear teeth 25 of the differential gear set 21.

In parallel, respective elements of the actuator 45 are one by one incorporated into the outer wall 11. The pawl 43 is, along with the return spring, incorporated inside the outer wall 11. These components are unitarily coupled with the aforementioned assembly.

The assembly including these components is coupled with the cover 15 and the output shaft 5 is coupled thereto. The first gear 33 is, as it is a helical gear, twisted and then meshed with the output shaft 5. In this step, as engagement of all the gears in the gear unit 1 are completed, the first gear 33 can be rotated by rotating any of these gears. For example, by inserting a collet jig into the left side gear 27L and slightly rotating the same for example, the first gear 33 can be rotated, thereby engaging the output shaft 5 therewith.

Although certain exemplary embodiments are described above, modifications and variations of the embodiments will occur to those skilled in the art, in light of the above teachings.

What is claimed is:

1. A gear unit to be used in combination with a power source having a hollow output shaft, comprising:
   a differential gear set having a rotation axis in common with the output shaft;
   a counter shaft fixedly including a first gear in mesh with the output shaft and a second gear in mesh with the differential gear set, wherein the first gear and the second gear constitutes a reduction gear set, wherein the counter shaft is set off from a reference plane including the rotation axis;
   a housing including an outer wall parting the differential gear set and the counter shaft from an exterior;
   a parking gear disposed axially opposite to the first gear beyond the second gear and fixed to the counter shaft; and
   an actuator configured to create a linear motion along a working axis, the actuator being fixed on the outer wall so as to direct the working axis perpendicular to the rotation axis and set off the working axis from the reference plane in a direction opposite to the counter axis; and
   a pawl so pivotally supported by the outer wall as to be pressed by the actuator to engage with the parking gear.

2. The gear unit of claim 1, wherein the pawl is disposed between the second gear and the outer wall.

3. The gear unit of claim 1, wherein the pawl is disposed between the actuator and the parking gear.

4. The gear unit of claim 1, wherein the second gear and the parking gear are disposed in a single chamber in the housing.

5. The gear unit of claim 4, wherein the housing further includes a partition wall separably combined with the outer wall to define the chamber and the partition wall includes a bearing rotatably supporting the differential gear set.

6. The gear unit of claim 5, wherein the partition wall includes an opening so dimensioned as to allow passage of the parking gear.

7. The gear unit of claim 1, wherein the actuator includes a motor configured to create a rotational motion and a cam mechanism configured to convert the rotational motion into the linear motion, and the motor projects outward from the outer wall.

8. The gear unit of claim 7, wherein the differential gear set, the counter shaft, the housing, the pawl and the cam mechanism are disposed so that a projection of the differential gear set, the counter shaft, the housing, the pawl and the cam mechanism on a plane perpendicular to both the rotation axis and the counter axis is within a range of a projection of the power source on the same plane.

9. The gear unit of claim 8, wherein the motor is so disposed as to project out from the projection of the power source.

* * * * *